(12) United States Patent
Kunow et al.

(10) Patent No.: US 7,091,883 B2
(45) Date of Patent: Aug. 15, 2006

(54) ABSOLUTE POSITION ENCODER

(75) Inventors: Peter Kunow, Berlin (DE); Klaus Biester, Wienhausen (DE)

(73) Assignee: Cameron International Corporation, Houston, TX (US)

( * ) Notice: Subject to any disclaimer, the term of this patent is extended or adjusted under 35 U.S.C. 154(b) by 0 days.

(21) Appl. No.: 10/506,221

(22) PCT Filed: Feb. 28, 2003

(86) PCT No.: PCT/EP03/02078

§ 371 (c)(1),
(2), (4) Date: Apr. 20, 2005

(87) PCT Pub. No.: WO03/074977

PCT Pub. Date: Sep. 12, 2003

(65) Prior Publication Data

US 2005/0275564 A1    Dec. 15, 2005

(30) Foreign Application Priority Data

Mar. 1, 2002 (DE) ............................... 102 09 058
Mar. 1, 2002 (DE) ........................... 202 03 298 U

(51) Int. Cl.
*H03M 1/22* (2006.01)
(52) U.S. Cl. ................. 341/9; 341/15; 341/16
(58) Field of Classification Search ............. 341/1–17, 341/192
See application file for complete search history.

(56) References Cited

U.S. PATENT DOCUMENTS 4,224,603 A    9/1980 Lallemand (Continued)

FOREIGN PATENT DOCUMENTS

DE    195 04 307    8/1996

(Continued)

OTHER PUBLICATIONS

International Search Report for Appln. No. PCT/EP03/02078 dated Jun. 4, 2003 (pp. 4).

(Continued)

*Primary Examiner*—Linh Van Nguyen
(74) *Attorney, Agent, or Firm*—Conley Rose, P.C.

(57) ABSTRACT

A transducer, a method and a coding pattern for determining a kinematic measurable variable are disclosed. A transducer comprises a first device part which is moveable in or through a corresponding device for oil or natural gas production and a second device part which is stationary relative to said first device part. To detect both the directions of movement and the respective position in a simple constructional and inexpensive way without the need for return movement up to ends of the range of movement, the first and/or second device part comprises a coding pattern which is changing along a direction of movement and of which position-specific patterns can be scanned by a scanning means which is arranged on the respective other device part. By scanning such a specific coding pattern during mutual relative movement of said objects or device parts a corresponding scanning signal can then be converted by an evaluation unit into a kinematic measurable variable. The corresponding coding pattern comprises a plurality of single patterns wherein neighboring single patterns differ from one another by at least one characteristic feature and/or said single pattern has at least one characteristic feature that is changing in the direction of movement.

51 Claims, 12 Drawing Sheets

U.S. PATENT DOCUMENTS

| | | |
|---|---|---|
| 5,576,535 A | 11/1996 | Oosterwijk et al. |
| 5,739,775 A | 4/1998 | Brandestini |
| 5,774,074 A * | 6/1998 | Cooper et al. ................ 341/11 |
| 5,918,199 A | 6/1999 | Yang et al. |
| 6,683,545 B1 * | 1/2004 | Strasser ....................... 341/16 |
| 6,856,261 B1 * | 2/2005 | Yoritsune et al. ............. 341/16 |
| 6,927,388 B1 * | 8/2005 | Imai et al. ............. 250/231.13 |
| 6,946,649 B1 * | 9/2005 | Uenaka et al. ......... 250/231.13 |
| 6,975,249 B1 * | 12/2005 | Hashimoto et al. ........... 341/16 |

FOREIGN PATENT DOCUMENTS

| | | |
|---|---|---|
| EP | 0 670 991 | 2/1997 |
| EP | 0 947 805 | 10/1999 |

OTHER PUBLICATIONS

German Office Action dated Oct. 6, 2005 (3 p.).

* cited by examiner ic # ABSOLUTE POSITION ENCODER

CROSS-REFERENCE TO RELATED APPLICATION

The present application claims priority to PCT/EP03/02078 filed 28 Feb. 2003 and to German Application No. 202 03 298.1 filed 1 Mar. 2002 and further to German Application No. 102 09 058.1 filed 1 Mar. 2002, all hereby incorporated herein by reference.

BACKGROUND OF THE INVENTION

The present invention relates to a transducer for at least one kinematic measurable variable, such as position, speed, or the like, particularly in devices for oil and natural gas production, comprising a first device part which is movable in or through the device, and whose kinematic measurable variable is to be determined, and a second device part which is stationary relative to the first device part. Furthermore, the invention relates to a method and a coding pattern for determining such a kinematic measurable variable.

Such transducers serve, for instance, to determine the position during displacement of the movable device part relative to the stationary device part. With the displacement of the parts relative to one another, the position of a shut-off device, a blow-out preventer, a rotary adjustment device, a valve, a throttle, or the like, is detected and represented at a desired place as positional information. The corresponding devices are used in oil and natural gas production for transportation along transportation pipelines, for changing the transportation capacity of the transportation pipelines, for shutting off the transportation pipelines in case of emergency, for adding chemicals to the transportation lines in a controlled way, or the like. At any rate, exact knowledge of the relative position of movable device part and stationary device part is required.

So far the position has e.g. been determined by assigning a scale to a spindle, a piston, or another movable device part, and by reading the corresponding position of the movable device part relative to the stationary device part from the scale. A further known possibility of determining the position is a potentiometer or linear resistor relative to which a contact is adjusted upon movement of the movable device part, so that the detected resistance is changed.

Finally a further possibility of determining the position is known where slits, or the like, are arranged as coding patterns on a scale at the same linear distance. These are sensed and counted to determine corresponding positions. Instead of a linear arrangement of such slits, a rotary disk is already known with slits arranged at a constant distance in circumferential direction, the slits being also sensed by light detectors, or the like, and then counted.

These known transducers have the disadvantage that in addition to the scanning of the similar and equally spaced subdivisions on the corresponding scale, for instance slits in an encoder disk, the corresponding subdivisions must be summed up in addition to the scanning operation to obtain corresponding information on the position. Furthermore, in the prior-art transducers it is not immediately apparent in which direction the movement actually takes place since it is not readily apparent, for instance, in the case of a straight movement whether the movement is to the left or to the right side. This applies by analogy to a rotating encoder disk in which the rotational direction is not easily detectable by the transducer.

A further drawback is that e.g. upon failure of an electronic means of the transducer the relative position between movable device part and stationary device part can no longer be detected and that a movement up to an end of the possible relative motion range is required to carry out the corresponding position determining operation once again.

U.S. Pat. No. 4,224,603 A discloses a device for locating the position of a moveable component with a binary code and five transducers. According to this document, it is possible to obtain an absolute coded position-location, wherein different displacements are shifted by one bit. The coded bit data is, for example, arranged on some kind of toothed rack and is realized by corresponding activation zones. Different positions or displacements are detected by scanning such coding pattern.

U.S. Pat. No. 5,576,535 A discloses a position detection system with two-bit coding by two types of markings arranged in a pseudo-arbitrary way. The corresponding. markings are provided on a piston rod moveable along a cylinder to which a detector is assigned. Groups of these markings are disposed in such a way that they partially overlap, such that each two successive groups have a different number of markings in common. A scanner unit used for scanning the markings of such a group can be a LED.

EP 0947 805 A is directed to an apparatus for determining the position of a moveable mechanical element. A marking is provided on a piston rod, wherein such markings may comprise code elements as a unique part of a pseudo-random binary sequence. The different code elements are optically readable.

U.S. Pat. No. 5,739,775 A is directed to a digital input and control device used for converting absolute angular or linear mechanical positions to a digital output. A corresponding encoder with conductive and non-conductive rotor segments is scanned by a number of contact elements. The different rotor segments are arranged in a sequence, such that a five-bit output code is realized, which is said to be a gray code sequence.

BRIEF SUMMARY OF THE PREFERRED EMBODIMENTS

It is therefore the object of the present invention to improve a transducer, a method and a coding pattern such that both the direction of the movement and the respective position can be detected in a simple, constructive and inexpensive way without the need for a return movement up to ends of the range of movement.

This object is achieved with the features of claim 1.

Due to the change in the coding pattern in the direction of movement of one device part and the various position-specific single patterns, the actual direction of the movement can be detected in an easy way. It is known in which way the coding pattern is changing, and it can therefore be detected in an easy way by scanning the coding pattern in which direction the movement takes place. Moreover, since the corresponding single patterns of the coding part are position-specific, it is even possible in a simple way and upon renewed start after a temporary failure of a corresponding electronic means, or the like, of the transducer that the current relative position is detected between first and second device part. At the most the first device part would have to be shifted to such an extent that the closest single pattern can clearly be sensed again by the scanning means. At any rate, a return movement of the first device part up to an end of the range of movement is not needed for determining the position again from said place or for determining the corresponding kinematic measurable variable. According to the invention the pattern comprises rising and/or falling edges succeeding one another in the direction of movement. These rising and falling edges constitute the position-specific structuring of the conductivity pattern, thereby permitting a definite determination of the relative position of coding pattern and scanning means.

Particularly in corresponding devices for oil and natural gas production, such a minimal movement of the first device part for the renewed determination of the corresponding kinematic measurable variable is of advantage because in this way the corresponding devices need not be moved back fully, e.g., in the case of a valve into a closing position or an opening position. Instead, a minimal movement is only needed for sensing the next single pattern.

Finally, it is here also of advantage that the scanned subdivision of a corresponding scale need not be summed up. Instead of this, the relative position between first and second device part is clearly determined by each position-specific single pattern.

According to the invention, the single patterns are formed from a position-specifically differently structured pattern that is arranged in the direction of movement. Such a pattern is e.g. formed by a conductive metal, such as copper or the like, which is arranged in a specific region having a specific structure. The structure is here chosen such that it is specific of the respective position of the conductivity pattern. An example of such different conductivity patterns would be different geometrical figures, or the like, which can be scanned accordingly by the scanning means, whereby the corresponding position can be determined.

To be able to determine the position in an easy and definite way, at least neighboring edge rises may have different absolute values. This means that e.g. in the case of a conductivity pattern having first a rising and then a falling edge in the direction of movement, the corresponding edge rises are different in their absolute value. This applies by analogy to neighboring conductivity patterns in which e.g. both the rising and the corresponding falling edges have different absolute values in the edge rise with respect to the neighboring conductivity pattern and also with respect to the edge rises of each conductivity pattern.

There is the possibility that the corresponding conductivity pattern has an approximately straight lower border extending in the direction of movement, from which the different edges extend each at one side. To improve the measured signal, it is however of benefit when the conductivity pattern is made symmetrical to a horizontal plane in the direction of movement. This means that the corresponding edges extend at both sides relative to said horizontal plane and in symmetry therewith.

The conductivity patterns, however, may also have different rising and/or falling edges at both sides relative to the above-mentioned horizontal plane.

In a simplified embodiment, it may be sufficient when the conductivity pattern is made substantially symmetrical to a line perpendicular to the direction of movement. This means that the conductivity patterns in the direction of movement are repetitive at the left and right side to said perpendicular line, but in a different, particularly opposite, order.

Different methods are possible for forming the corresponding conductivity patterns. For instance, the conductivity pattern could be detached from a metal foil and then applied to a corresponding pattern carrier. A simple production can be seen in the measure that the coding pattern and the different conductivity pattern, respectively, can directly be produced by etching, or the like. Such production methods are e.g. used in the manufacture of printed circuit boards.

To be able to carry out the scanning of the single patterns in a faster way, the scanning means may comprise a number of single scanning elements. Depending on the number of said single scanning elements, the corresponding single pattern can be sensed partly or also completely in one scanning operation.

Scanning means and single pattern can preferably be assigned such that an extension of the scanning means or the single scanning elements in the direction of movement substantially corresponds to a length of each single pattern of the coding pattern. As a result, a single pattern is also directly sensed by each single scanning element without e.g. a single pattern being sensed by neighboring single scanning elements or without a plurality of single patterns being sensed by a single scanning element at the same time. This increases the resolution in the detection of the kinematic measurable variable and each single pattern can be reliably scanned at the same time.

To enhance, if necessary, the resolution by single patterns and scanning elements, n single patterns of a coding pattern may have assigned thereto n+1 or n−1 single scanning elements. As a result, either the scale with the single pattern or that with the single scanning elements is a vernier scale which is shorter by one respective element. For instance, if 10 single patterns are provided each coding pattern, the vernier scale of the single scanning elements may comprise nine single scanning elements. The ten single patterns have the same length as the nine single scanning elements, so that e.g. the first single pattern is shifted by 1/10, the second by 2/10, etc., each with respect to the single scanning element.

It is possible to form a single pattern by at least one single bit. For a complete sensing of the single pattern without a displacement of the scanning means relative to the single pattern, and in order to accelerate the scanning operation, a single scanning element may be assigned to each single bit of a bit pattern group (data word width) as the single pattern group. The whole data word width and thus the kinematic measurable variable is thereby sensed in one scanning operation.

Furthermore, the resolution of the detection of the kinematic measurable variable can be enhanced when the bit pattern groups are shifted in the direction of movement by one respective single bit relative to one another. This means that the next position-specific bit pattern group is sensed by shifting the scanning means relative to the bit pattern by one single bit only, so that the resolution is substantially defined by the width of the single bit and the single scanning element, respectively.

The coding pattern can be realized in different ways in the case of coding patterns in the dual system, only two different features or states have to be assigned to the single bits. The corresponding features/states can be detected by the scanning means.

An example of two states of such a type for corresponding single bits or single patterns is that the corresponding coding pattern is formed by recesses and/or elevations. This means that single bits may differ from one another by different depths of the recesses, heights of the elevations, or the like. Recesses and elevations may also alternate, and the recesses may each have the same depth and the elevations the same height in this instance.

Another possibility of realizing such a bit pattern are regions of different conductivity or regions with different reflectivity.

In regions with different conductivity, a single scanning element may e.g. comprise at least one coil. When an a.c. voltage is applied to said coil, the coil exhibits different damping characteristics in response to the conductivity of the corresponding detected regions, each of which forms a single pattern. This applies by analogy to single patterns of different recesses and/or elevations because said elevations and recesses may also have different impacts on a coil supplied with a.c. voltage.

To be able to determine the kinematic measurable variable in a redundant way, two scanning means may be arranged, particularly in direct vicinity in the direction of movement. For instance, when one of the scanning means fails, the instantaneous position and a change in the position can be detected by the corresponding other scanning means. Especially for the scanning of the whole range of movement of the two device parts, it is advantageous when the scanning means are arranged in direct vicinity.

Scanning means and coding patterns are arranged between the two device parts in accordance with the direction of the relative movement. For instance, when the direction of movement is straight, coding pattern and scanning means also extend along a straight line.

Other possibilities regarding directions of movement are a helically extending or a substantially circularly extending direction of movement. Coding pattern and scanning means can each be arranged accordingly.

A further possibility of forming a coding pattern may be seen in the measure that the pattern is formed along a coding pattern carrier which is fastened to a device part in a particularly detachable manner. The coding pattern may be designed on the corresponding coding pattern carrier in accordance with the respectively desired resolution. A coding pattern can be replaced by a finer or coarser coding pattern thanks to the possibility of exchanging the coding pattern carrier.

To supply specifically the scanning means with electrical power and to transmit corresponding signals of the scanning means to an associated evaluation means, a corresponding electrical line may be passed from the scanning means along a line bore.

For the detection of kinematic measurable variables during a rotational movement, it may be of advantage when the coding pattern comprises single patterns arranged along a circular path. For instance, upon rotation of the movable device part, the single patterns can then be scanned along the circular path on the stationary device part via a correspondingly co-rotated scanning means. It is also possible that the single patterns are arranged on the movable or rotary device part and that the scanning means is provided accordingly along the circular path of the single patterns on the stationary device part.

When the coding pattern is arranged or at least assigned relative to the movable device part, the coding pattern may comprise single patterns arranged along a circumference of a disk. The single patterns, in turn, may be formed by regions of different conductivity, of different reflectivity, with recesses and/or elevations, or the like. The corresponding single scanning elements of the scanning means on the stationary device part are here assigned to the circumference of the disk.

Instead of a scanning operation from a radial direction, a scanning operation may be carried out essentially in a direction perpendicular to the disk plane with a corresponding arrangement of the coding pattern. The scanning operation can e.g. be carried out in that the coding pattern comprises single bits slotted in the disk as single patterns. It is also possible to design the slits with a width increasing in radial direction. Especially in this connection, it can be regarded as an advantage when the single scanning elements are radially adjustable. Thanks to the radial adjustment a single scanning element can exactly be assigned to the region of the slit-shaped single bit which in its extension in rotational direction corresponds to the corresponding extension of the single scanning element.

Depending on the respective requirement, a corresponding coding pattern may comprise a corresponding number of single bits. For instance, the coding of the position can take place by way of 4, 5, 6, 7 or more single bits per coding pattern. The number of the single scanning elements of the scanning means defines the number of the single bits of a coding pattern. This means that preferably four single scanning elements are used in the case of a four-bit coding.

To control and, optionally, check the movements of the first device part relative to the second device part for at least a certain period of time, the transducer may comprise at least a storing means for storing measured signals of the scanning means in response to the position.

Favorably, signals of at least a number of single scanning elements can optionally be stored here in dependence upon the position. The number of the single scanning elements is here preferably identical with the number of the single patterns of a coding pattern.

To obtain information on the whole range of movement, initial measured-signal information may be storable in the storing means at least once for a total range of movement of the scanning means and/or at least a number of single scanning elements.

To improve the resolution in the measurement of the kinematic measurable variable, the transducer may comprise a comparing means for comparing the initial measured-signal information with current measured-signal information. The corresponding current measured-signal information can be used by way of comparison with the initial measured-signal information for determining exactly to which region of the initial measured-signal information the current measured-signal information corresponds. The relative position between movable device part and stationary device part can thereby be determined with higher accuracy than the resolution by the single patterns. The corresponding resolution depends on the resolution of the corresponding measured-signal information. When said resolution is correspondingly high, a measurement and evaluation of the current measured-signal information cap e.g. be carried out substantially in analog form or at least in quasi analog form. This can considerably enhance the resolution by the single patterns.

Thanks to the above-mentioned higher resolution it is further possible to dispense with the displacement of the first device part in case of temporary failure of a corresponding electronic means, or the like, so as to sense the present relative position between first and second device part again. The above-described movement of the first device part for the definite detection of the closest kit pattern group or single pattern in case of renewed start is thus not necessary either. Instead of this, one obtains an absolute-value determining means for each position of first and second device part relative to one another, which upon a renewed start, e.g. after failure of the electronic means, directly permits the determination of the corresponding relative position with high accuracy.

To lose no information during the determination of the kinematic measurable variable during comparison of the measured-signal information for the exact determination of the position, at least the last current measured-signal information may be stored after its acquisition until its replacement by subsequent current signal information.

To enhance the resolution of the determination of the kinematic measurable variable in a simple way, scanning means and/or coding patterns may be designed such that they can be replaced. This can e.g. be accomplished by replacing the above-mentioned scanner carrier or coding pattern carrier. In connection with the arrangement of two scanning means, the coding pattern can be replaced by a coding pattern having twice the number of single patterns. These are then sensed by the two scanning means at the same time for determining the kinematic measurable variable.

To supply scanning means, in particular, including a number of single scanning elements, with electrical power in a safe and simple way, a particularly pressure-resistant multiple cable passage may be provided for the electrical connection of the scanning means. This passage is preferably arranged in the stationary device part and serves the simultaneous electrical supply of all single scanning elements of the scanning means.

It should additionally be noted that the initial measured-signal information can also be determined by a few single scanning elements only, said information being compared with corresponding current measured-signal information of the same single scanning elements. For reasons of redundancy corresponding measured-signal information of all scanning elements may be compared.

The single patterns may be characterized by two possible states (features). It is also possible that the single patterns comprise more than two states and that all of said states can be detected by corresponding single scanning elements. Of course, it is also possible to determine other kinematic measurable variables in addition to the position, e.g. speed and acceleration. Appropriate electrical means for differentiating the position values in time, and thus the sensed distance covered, can be assigned to the transducer.

To sense the different conductivity patterns of the coding pattern with the help of a corresponding scanning means in an easy and fast way and to be able to detect the corresponding kinematic measurable variable, such as position, speed, or the like, the scanning means may comprise a number of coils as single scanning elements which are arranged one after the other particularly in the direction of movement. Advantageously, each of the single scanning elements may be designed as a coil which is wound substantially helically in a plane. This coil can be produced by analogy with the conductivity pattern by etching, or the like, directly, e.g., on the corresponding scanner carrier. Simple examples of such coils wound in a plane are e.g. square coils.

It is possible to arrange and form not only the coil, but also the conductors powering the same, on a corresponding surface of the scanner carrier, it is here also possible that the conductors for powering the coil are arranged on both surfaces of the scanner carrier and connected by the scanner carrier to the coil which is e.g. only arranged at one side.

To obtain a reliable measurement signal with adequate noise ratio, two scanner carriers with corresponding coils and conductors may e.g. be assigned to one pattern carrier. This can be implemented in an embodiment which can easily be realized by the measure that a pattern carrier is movably supported between two scanner carriers relative to said carriers.

in this instance, the two scanner carriers can be designed to be separated from each other. The corresponding measurement signals of the single scanning elements must here be combined with one another to scan the corresponding pattern carrier at both sides for determining the corresponding kinematic measurable variable.

It is however also possible that the scanner carrier is substantially designed as a carrier foil with central piece and two carrier arms projecting therefrom, the central piece being designed as an electrical connection section and the carrier arms comprising scanning elements and conductors and being adapted to be arranged at both sides relative to the pattern carrier. Such a carrier foil can be produced easily as a scanner carrier, and similar techniques as in the case of printed circuit boards or other electronic components can here be employed again.

To simplify the construction of the scanning means, it is possible to connect the scanning coils in parallel.

To improve the resolution of the transducer in this connection, an extension of all scanning coils in the direction of movement and/or in a direction perpendicular thereto can be greater than the maximum length or height of a single pattern, so that the scanning coils can be assigned to a rising and or a falling edge of each single pattern or of directly neighboring single patterns. This avoids a situation where e.g. all single scanning elements in a specific relative position of scanning elements and single patterns only measure a falling or a rising edge of a single pattern.

Production can here be simplified further when the height or amplitude of all single patterns, i.e. the corresponding conductivity pattern, is the same.

According to the method the above-mentioned object is achieved by the features of patent claim 37.

The method according to the invention is e.g. characterized in that the scanning means scans, with a number of scanning coils as the single scanning elements, at least an edge that is rising and falling relative to the direction of movement, the edge pertaining to one or two single patterns made from a conductive material. Said single patterns form in particular a conductivity pattern which has a position-specific structuring on account of said rising and falling edges.

In this instance, too, the scanning operation can be performed at both sides with respect to the coding pattern.

To determine the kinematic measurable variable in a fast way, the scanning means can scan each single pattern of the coding pattern singly and successively. Depending on the number of the single patterns pertaining to one single pattern group, the result of the scanning operation is combined for this number of single patterns, whereby the scanning of the single pattern group is achieved.

If the scanning operation is to be accelerated further, a scanning means can also scan all of the single patterns of a single pattern group at the same time.

it is self-evident that the single patterns must be scanned in some way or other. The features or states of a single pattern may e.g. serve the scanning operation. man embodiment, the single pattern may e.g. comprise two different physical or corporeal features in an alternative way. An example of such corporeal features is a recess or elevation in the movable or stationary object. Said corporeal features can be detected by corresponding configurations of the scanning means. The design of the corporeal features is also possible on the stationary object, the scanning means being arranged on the respectively other object. It is also possible to provide both single patterns and scanning means on both objects, whereby a redundant determination of the kinematic measurable variables is possible in an easy way.

In one embodiment, each single pattern may also have e.g. two differently electrically conductive states as an alternative. This means that the coding pattern consists of differently electrically conductive single patterns.

In yet another embodiment the single patterns may differ in their magnetic properties.

It is not necessary to code a positioned-based single pattern group by three, four, five, six, seven, eight or more single bits as single pattern.

The respective width of a single pattern may be relatively small so that the resolution of the kinematic measurable variable can be increased accordingly.

To improve the resolution in the measurement of the kinematic variable, a comparing means may compare current measured-signal information of the scanning means with the total measured-signal information for determining transitions, in particular, between the single patterns. The relative position between movable object and stationary object can thereby be detected with higher accuracy than the resolution by the single patterns. This corresponding resolution is related with the resolution of the corresponding measured-signal information. If said resolution is correspondingly high, a measurement and evaluation of the current measured-signal information can e.g. be carried out in a substantially analog form or at least in a quasi analog form. This considerably enhances the resolution by the single pattern.

Furthermore, the invention relates to a corresponding coding pattern according to claim 45, specifically for determining a kinematic measurable variable, for instance for determining the position, the coding pattern comprising a plurality of single patterns, wherein each single pattern is formed from an in particular electrically conductive material with edges that are rising and/or failing in its direction of extension corresponding to the direction of movement of one device part mentioned above. On account of the edges that have different lengths and are rising or failing in different ways, one obtains the position-specific structure.

To distinguish different single patterns in an easy way in this connection, the edge rises of one and/or neighboring single patterns may have different absolute values.

For simplifying the generation of the corresponding single patterns, the heights or amplitudes of all single patterns may be the same in a direction perpendicular to the direction of movement.

To provide the single patterns in a simple way, the corresponding coding pattern may be formed on a pattern carrier extending substantially in the direction of movement. The generation of the corresponding single patterns and thus of the whole coding pattern can be simplified in that said pattern is produced on the pattern carrier by etching, or the like. Corresponding manufacturing methods are e.g. also known for conductors in printed circuits or in printed circuit boards.

Such a coding pattern can also be used in a different way for determining a kinematic measurable variable. For instance, it can clearly mark specific positions along an object, each corresponding single pattern having assigned thereto a specific positional region along the object. Thanks to this positional assignment, a definite encoding of such a position is carried out at the same time, so that it can be used for the assignment of a further object to the object provided with the coding pattern. Further uses for such a coding pattern are obvious.

It should further be noted that several coding patterns can also be arranged one after the other if the successive coding patterns are distinguished by a further characteristic feature. For instance, a different color of the successive coding patterns could be a distinctive criterion. In another embodiment, the single patterns of a coding pattern might e.g. be distinguished by different corporeal features whereas the single patterns of a further coding pattern might differ e.g. in their conductivity, their magnetic properties or in another detectable characteristic feature. Likewise, there is the possibility that such coding patterns are not arranged one after the other, but are offset relative to each other, whereby e.g. the resolution can be enhanced in an easy way in comparison with only one coding pattern. A possibility of such an offset of two coding patterns relative to one another is the gapwise registration of two coding patterns. This idea can also be transferred to three, four or more coding patterns.

Various possibilities exist for marking the single patterns as to their informative content. For instance, each single pattern might have assigned thereto specific variable features or states of a body or partial body, with the kinematic variable of the body or partial body having to be determined. Examples of such specific features or states are elevations/recesses, different reflectivity, different electrical conductivity, different magnetic properties, different color, etc. The corresponding features or states can be scanned by a corresponding scanning means and then converted by an evaluation means into a corresponding kinematic measurable variable.

The single patterns forming the coding pattern can be arranged in different ways, depending on the requirements. A linear, circular or also helical arrangement is possible.

It is known that a decimal value can clearly be assigned to each single pattern group consisting of bit-like single patterns. This means that the assignment in both directions is so clear that exactly one decimal value is assigned to each single pattern group and exactly one single pattern group is assigned to each decimal value. The single pattern groups are coded in analog form.

An example of such a coding of the single pattern is a binary single pattern. The coding pattern can be composed of different numbers of single patterns, said number depending, inter alia, on the type of coding of the coding pattern and the number of the features or states that are possible for a single pattern. In one embodiment, the single pattern has $2^n$ single bits with n as the natural number and n single bits per single pattern group. For instance, when n=4, 16 single patterns are used, and single pattern groups of four single patterns each. Since each single pattern group is possibly obtained by displacement by only one single bit from the respectively preceding or succeeding single pattern group, 16 single pattern groups are obtained in this way. Like in a binary system, a decimal value of 0 to 15 can clearly be assigned to each single pattern group, so that 16 different position values can be scanned. As has already been stated above, intermediate position values due to transitions between the single patterns can also be detected.

BRIEF DESCRIPTION OF THE DRAWINGS

Advantageous embodiments of the present invention will now be explained in more detail with reference to the figures which are attached to the drawing, and of which.

DETAILED DESCRIPTION OF THE PREFERRED EMBODIMENTS

Figure 1:
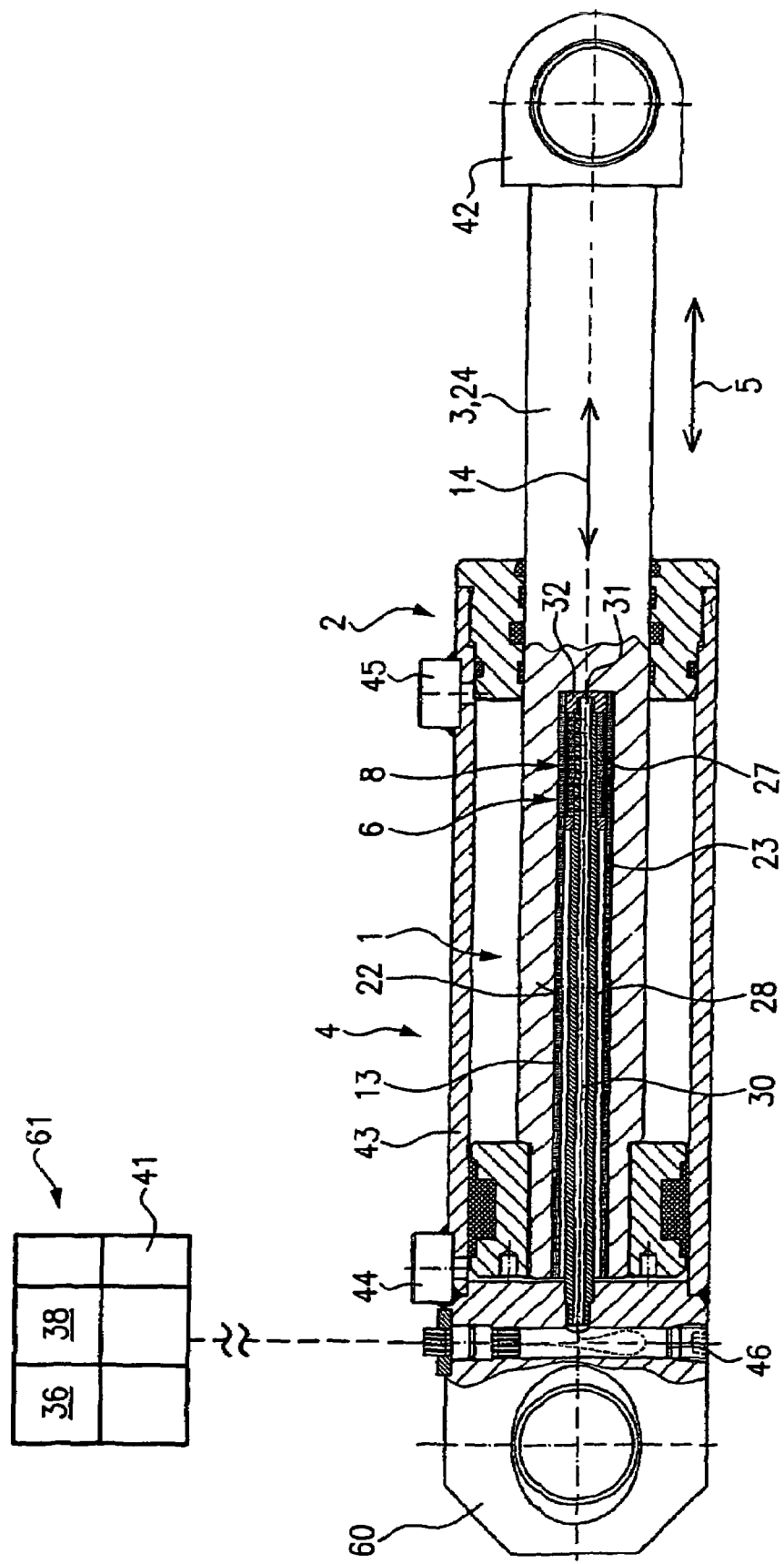
FIG. 1 is a longitudinal section through a device with a transducer.

FIG. 1 shows a longitudinal section through a device 2 for oil and natural gas production with a first embodiment of a transducer 1 according to the invention. The device 2 comprises a piston 24 which can be pushed out of a cylindrical housing 43, as a movable first device part 3. Housing 43 with a further part mounted thereon forms a stationary second device part 4. The piston 24 is displaceably supported within the housing 43. The housing comprises an inlet 44 and an outlet 45 for a pressurized fluid. When pressurized fluid is supplied to the inlet 44, the piston is displaced in the direction of movement 5 to the right in FIG. 1. The movement is here carried out in the longitudinal direction 14 of the device 2.

At its free end 42, for operating a valve, a rotary adjustment device, a blow-out preventer, a throttle, or other means for oil and natural gas production, the piston 24 is movably connected thereto.

At least in its section arranged in housing 43, the piston 24 has an inner bore 23 with a corresponding inner wall 22. A scanner carrier 28 is inserted into said inner bore 23. The scanner carrier 28 extends in coaxial direction relative to the inner bore 23. The scanner carrier 28 extends from one end 60 of the housing 43 in the longitudinal direction 14 of the device 2. A line bore 30 within the scanner carrier 28 communicates with a line passage 46 at an end facing the housing end 60 for laying electrical connection lines 29 through line passage 46 and line bore 3D between a scanning means 8 arranged at the free end 27 of the scanner carrier 28 and an evaluation and control means of the transducer 1 arranged remote from the device 2.

In FIG. 1 the control and evaluation means 61 comprises a comparing means 38, a storing means 36, a display means 41 and, optionally, further means.

Figure 16:
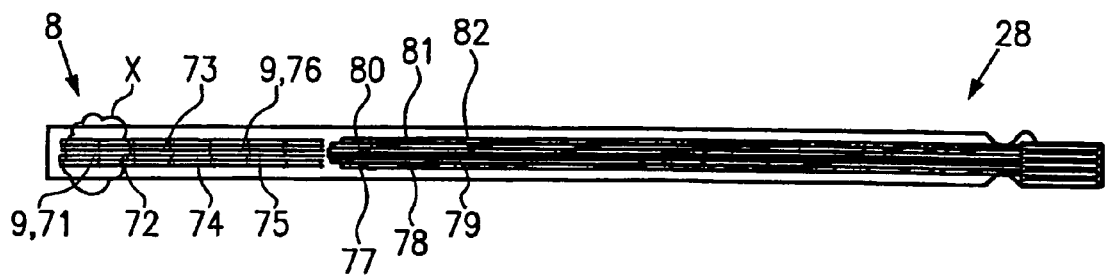
FIG. 16 is a top view on a scanning means according to the invention assigned to the coding pattern according to FIG. 15.

The scanning means 8 comprises a number of single scanning elements 9, see also FIG. 16 which are arranged directly next to one another in the longitudinal direction 14 of the device 2. In the illustrated embodiment, the single scanning elements 9 are formed by coils 19, see the following figures. A total of eight single scanning elements 9 are provided. Directly next to the scanning means 8, an end plug 32 is mounted on the front end 31 of the line bore 30.

Figure 15:
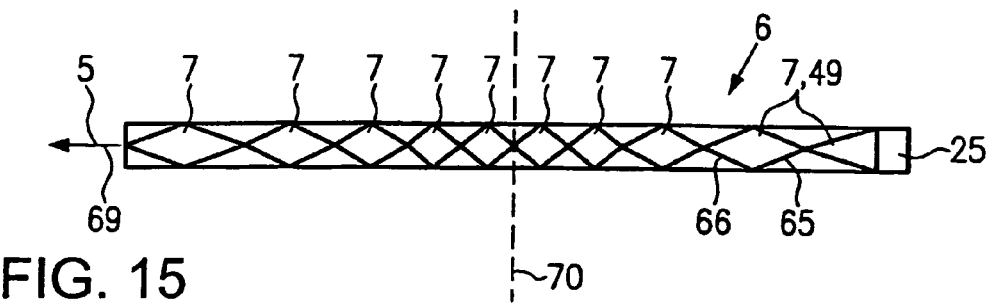
FIG. 15 is a top view on a coding pattern according to the invention with differently structured conductivity patterns as single patterns.

A coding pattern which is composed of a number of single patterns 7, see also FIG. 15, is formed or arranged along the inner wall 22. The scanning means 8 with its single scanning elements 9 can be assigned to a respective bit pattern group 7.

When the piston 24 is pushed to the right side in FIG. 1, the bit pattern 6 also moves in a corresponding way relative to the scanning means 8 to the right side in FIG. 1. As a result, the scanning means 8 scans the various pattern groups 7 and the relative position between scanning means 8 and coding pattern 6 can be detected through the changes of the coding pattern or the corresponding position-specific pattern groups, and the displacement path of the piston 24 to the right or left side in FIG. 1 can be detected accordingly.

As for the embodiment shown in FIG. 1, it should be noted that the pattern groups comprise regions of different conductivity. It should once again be noted that such a single scanning element 9 is formed by an electrical coil 19.

Figure 2:
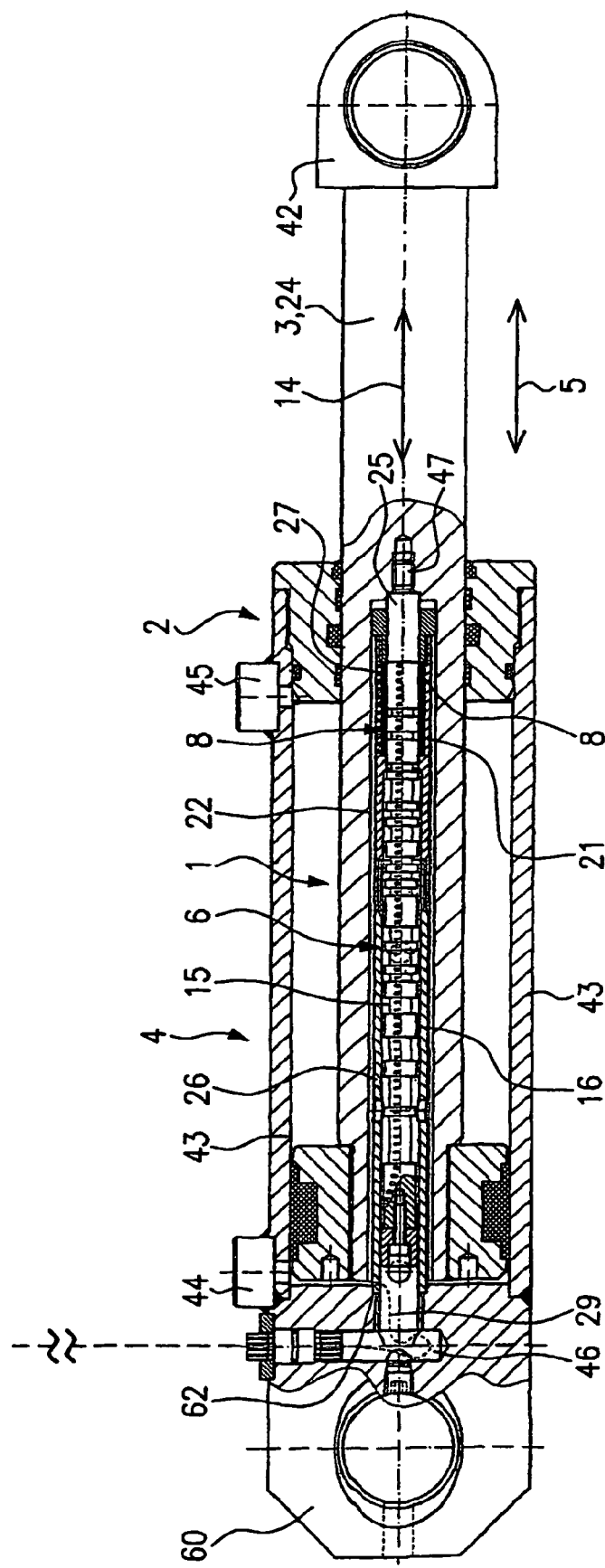
FIG. 2 is a longitudinal section, by analogy with FIG. 1, with a second embodiment of a transducer.

FIG. 2 shows the device 2 of FIG. 1 with another transducer 1. This essentially differs from the first embodiment in that the coding pattern 6 is formed on a pattern carrier 25 which is connected to the piston 24 by means of a stud 47. The pattern carrier 25 extends in a direction coaxial to the inner bore 23 of the piston 24. A scanner sleeve 26 is inserted between pattern carrier 25 and inner wall 22 of the inner bore 23. At its free end 27, said sleeve comprises two directly neighboring scanning means 8, 11. The scanning means 8 is identical with that according to FIG. 1. The scanning means 21 is of a redundant type. Each of the two scanning means 8, 21 comprises six single scanning elements 9. The scanner sleeve 26 is connected at its end opposite the scanning means 8,11, by analogy with FIG. 1, to the housing end 20 as a stationary second device part 4. Such an inverse arrangement of scanning means 8 and coding pattern 6 is also possible according to the invention.

The pattern carrier 25 comprises a coding pattern 6 formed by recesses 15 and elevations 16. This means that the various regions of the coding pattern are formed by said recesses, and each recess or elevation can comprise a single bit 13 or a number of single bits 13.

Corresponding electrical lines 29 for feeding the scanning means 8 and 11 and for determining corresponding signals in the direction of the control and evaluation unit 61 (see also FIG. 1) are laid along an outer surface of the scanner sleeve 26 in the direction of the housing end 60. At said place, the scanner sleeve 26 includes a bore 62 through which the electrical lines 29 are guided in the direction of line passage 46.

Figure 3:
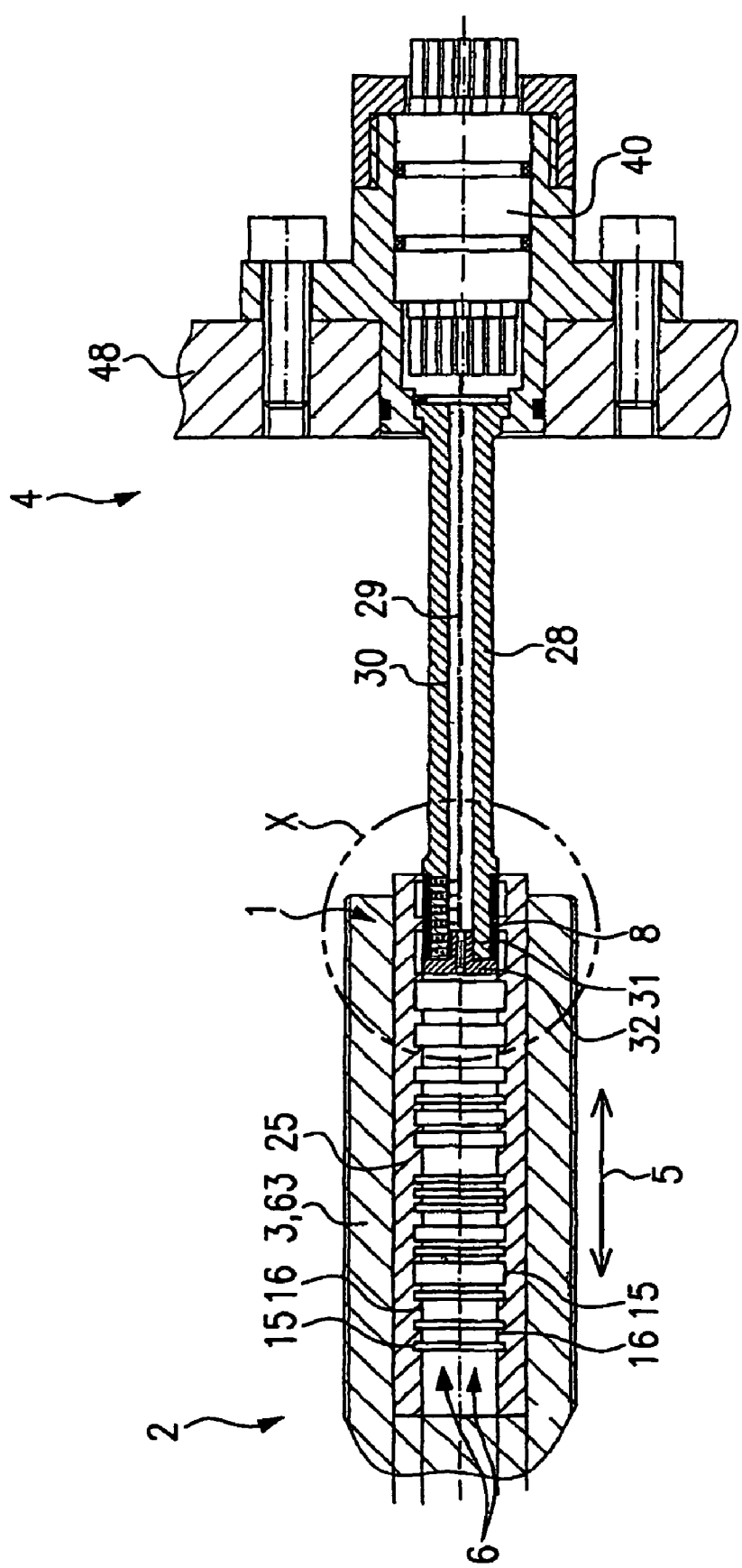
FIG. 3 is a longitudinal section through a further device with a third embodiment of a transducer.

FIG. 3 shows a transducer 1, in connection with a device 2 comprising a rotary spindle 63 as a movable first device part 3. The rotary spindle 63 is rotatable manually, electrically, or in another way, and serves to adjust a valve, a throttle, or the like. A pattern carrier 25 is inserted into the rotary spindle 63. This carrier, in turn, comprises regions with recesses 15 and/or elevations 16 that form a corresponding coding pattern 6. The pattern carrier 25 is adjustable together with the rotary spindle 63 in the direction of movement 5.

A scanner carrier 28 as part of a stationary second device part 4 is inserted into the pattern carrier 25. At its free end 31, the scanner carrier 28 comprises a scanning means 8. By analogy with the two preceding examples, the scanning means is formed by a number of coils 19 as single scanning elements 9 (see also FIGS. 4 and 5). A line bore 30 through which a number of electrical lines 29 are guided to each of the coils 19 is arranged within the scanner carrier 28. With its end opposite to the scanning means 9, the scanner carrier 28 is secured to a housing 48. A pressure-resistant multiple cable passage 40 through which the corresponding electrical lines 29 are passed is arranged within said housing.

It should be noted that the scanning means 8 according to FIG. 3 consists of twelve single scanning elements 9. However, there is also the possibility that the twelve single scanning elements 9, namely six elements each, form the scanning means 8 and the redundant scanning means 21 (see also FIG. 2).

Figure 4:
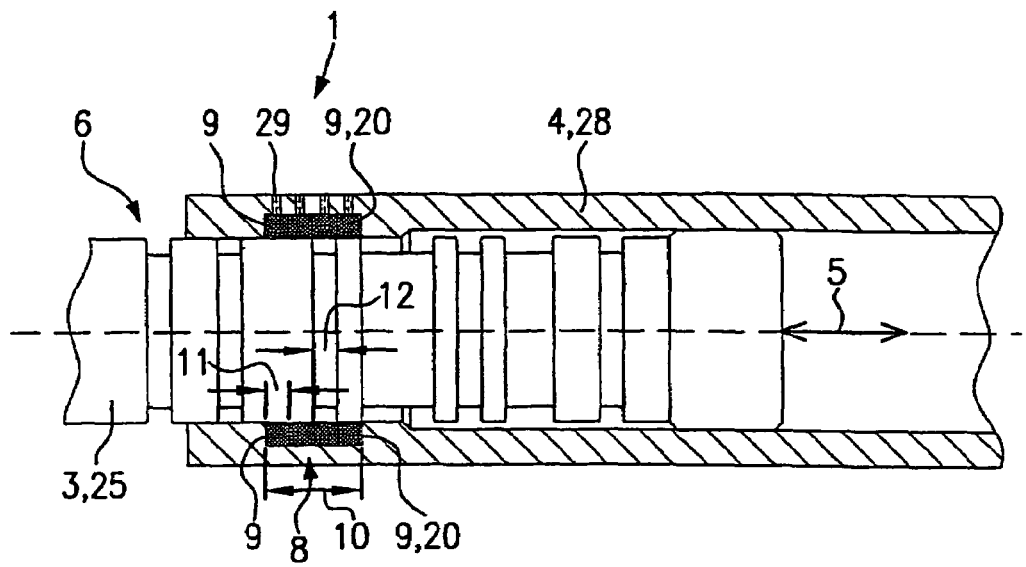
FIG. 4 shows a fourth embodiment of a transducer.
Figure 5:
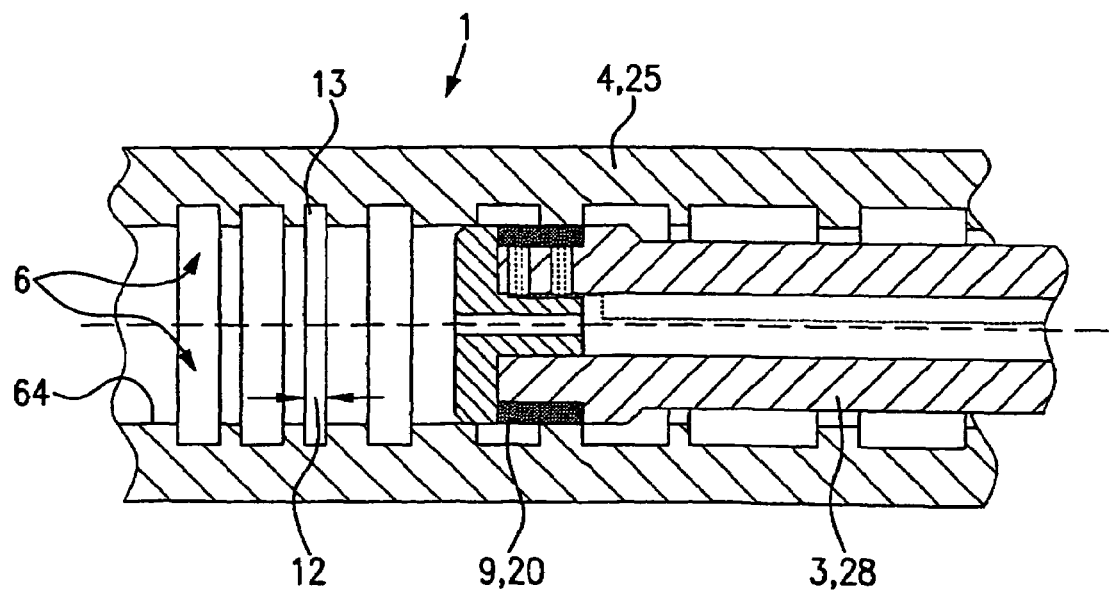
FIG. 5 is a view showing a detail "X" of FIG. 3 without a redundant type of the transducer.

FIGS. 4 and 5 show two further transducers 1. These differ essentially in that in FIG. 4 the bit pattern carrier 25 is the movable first device part or has said part assigned to it, whereas in FIG. 5 the scanner carrier 28 is the movable first device part or has said part assigned to it.

In both of them, the corresponding scanning means 8 comprises four single scanning elements 9 which are formed by light-emitting diodes. Said light-emitting diodes emit light and receive reflected light from the respective single bit of the coding pattern 6, with different quantities of light being reflected by the various regions of the coding pattern 6 and the single bit pattern groups 7, respectively. In such a case the different regions are formed by recesses 15 and elevations 16. It should be noted with respect to the elevations 16 that these are only obtained relative to the recesses 15 and that in the illustrated embodiment these are not formed by elevations 16 projecting beyond an inner surface 64. However, the elevations 16 can also be formed on the inner surface 64, so that the recesses 15 are obtained only relative to said elevations 16 or are formed in the inner surface.

An extension 11 of the single scanning elements 9 in the direction of movement 5 is essentially defined by a length 5 of a single bit 13. Accordingly the single scanning elements 9 that are arranged side by side define a total extension 10 of the scanning means 8 in the direction of movement 5. The extension 10 of the scanning means 8 corresponds to the length of a bit pattern group 7, so that there is a four-bit coding of the coding pattern 6 in the embodiments of the transducer 1 as illustrated in FIGS. 4 and 5.

Instead of the light-emitting diodes, the single scanning elements 9 according to 4 and 5 could also be formed by electrical coils 19, see also FIG. 16, and a coding pattern 6 according to FIG. 15 can be used. If supplied with a corresponding a.c. voltage, these would transmit different signals to the outside, depending on the scanning of a recess or of an elevation.

As has already been explained in the preceding embodiments, regions of different conductivity, see FIG. 15, different reflectivity, or the like, could be formed instead of elevations and recesses. In this instance these would form the single patterns.

Each of the light-emitting diodes or electrical coils 19 is connected via corresponding electrical lines 29 to a source of voltage for the supply of or signal transmission with the control and evaluation unit 61 (see also FIG. 1).

FIGS. 6 to 9 show further transducers 1. In these embodiments the movable first device part 3 carries out a rotational or screw motion whereas the stationary second device part 4 extends at least in part along the circumference of the first device part 4. Corresponding arrangements are also possible with pattern 6 and scanning means 8 according to FIGS. 15 and 16.

Furthermore, attention should be paid in FIGS. 6 to 9 to the fact that in one half of each figure electrical coils are arranged as an example of single scanning elements 9 and that in the other half light-emitting diodes 20 are arranged as single scanning elements 9.

Figure 6:
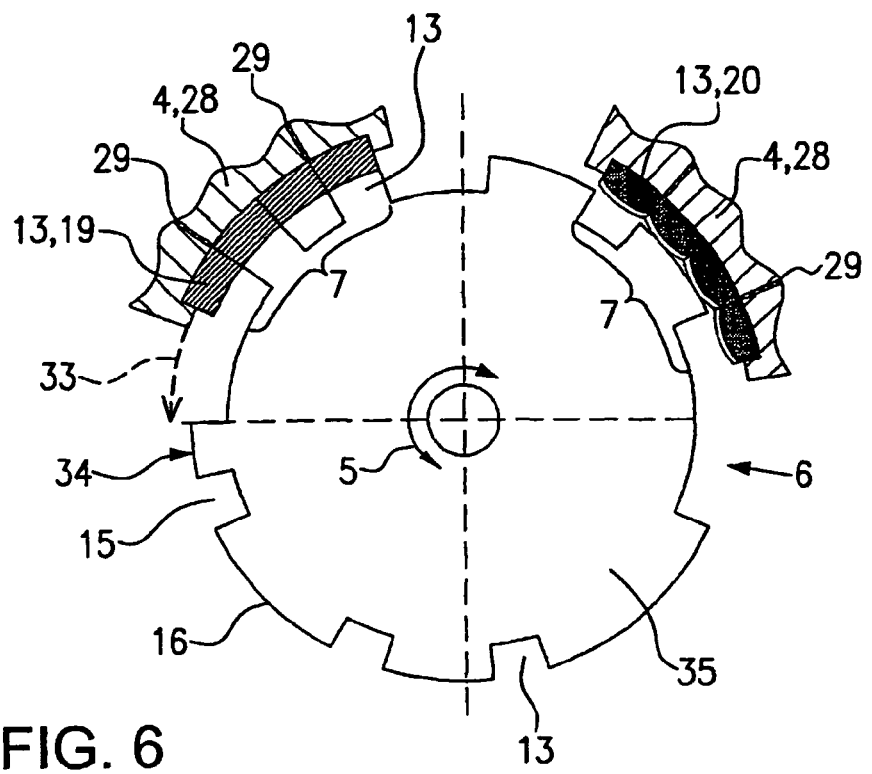
FIG. 6 shows two further embodiments of a transducer in connection with an encoder disk.

In FIG. 6, a disk 35 as a movable first device part 3, or as a disk that is motion-connected to said device part, is provided along its circumference with recesses 15 and/or elevations 16 which form a corresponding bit pattern 6. The length of single patterns forming the coding pattern 6 follows accordingly from the extension of the scanning means 8 in circumferential direction or along the circular path 33 of the disk 35. In this instance, each coding pattern 6 is formed by four single bits 14, and a respective single scanning element 9 can be assigned to each single bit.

While the direction of movement 5 in FIGS. 1–5 is straight, it is circular or helical in FIGS. 6 to 9.

In these embodiments, too, the coding pattern changes along the circumference 34 of the disk 35 and comprises corresponding position-specific single patterns in the form of bit pattern groups. What is also applicable to these embodiments is that neighboring bit pattern groups differ from one another by one single bit 13 each.

Figure 7:
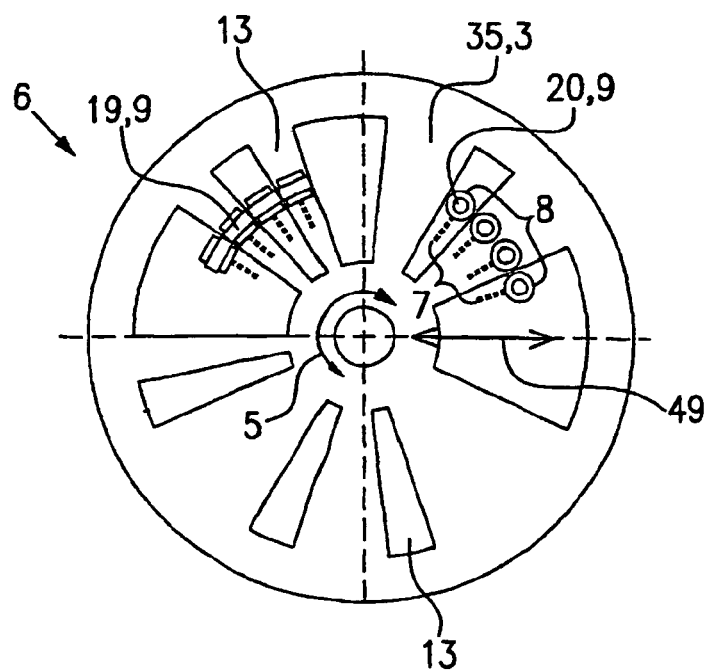
FIG. 7 shows two further embodiments of the transducer in connection with a slotted encoder disk.

While in FIG. 6 the scanning operation is carried out with the help of the scanning means 8 radially from the outside, with the recesses and elevations 15, 16 being arranged in the circumference 34 of the disk 35, the scanning operation is carried out in FIG. 7 in a direction perpendicular to the disk plane. In this instance, the single bits 13 or bit pattern groups 7 are formed by slots in the disk surface. However, it should be noted that the regions positioned between the slots form single bits or bit pattern groups (see e.g. the bit pattern group 7 assigned to the light-emitting diodes).

The slits formed in the disk extend radially to the outside. To be able to scan a single bit exactly, the single scanning elements 9 are adjustably arranged in radial direction. When smaller scanning elements 9 are e.g. used, these can be shifted radially more to the inside to be exactly assignable to a single bit 13.

Figure 8:
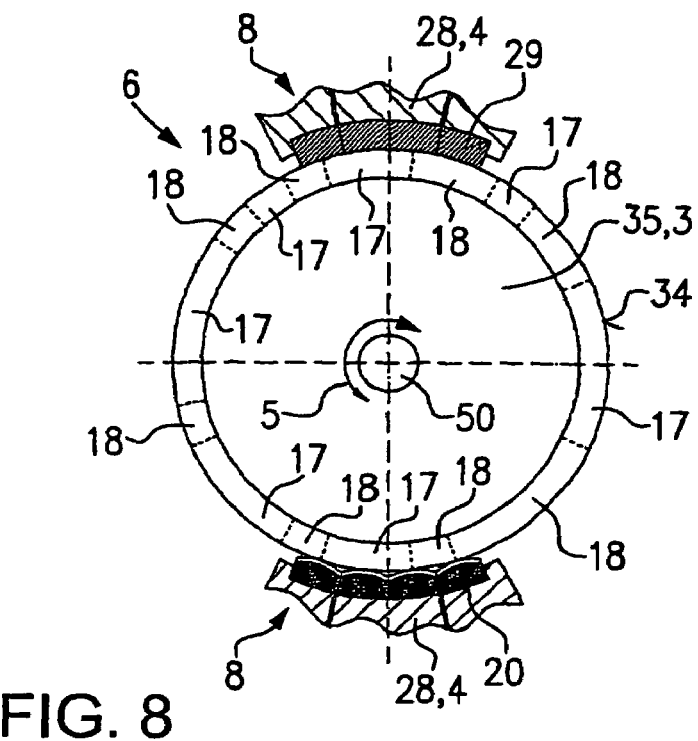
FIG. 8 shows two further embodiments of the transducer in connection with a rotating means.

In FIG. 8, openings are formed in the circumference 34 of the disk 35, so that the corresponding bit patterns 6 are formed by region 17 with openings and/or regions 18 without openings. The scanning means 8 which are again formed by light-emitting diodes or electrical coils 19 are movable along the circumference 34. The single scanning elements 9 scan the different regions 17, 19 and thus the single bits 13. In accordance with the number of the single scanning elements 9, a four-bit coding is also found in the embodiment according to FIGS. 8 and 9, each bit-pattern group 7 comprising four single bits 13 in this instance.

Figure 9:
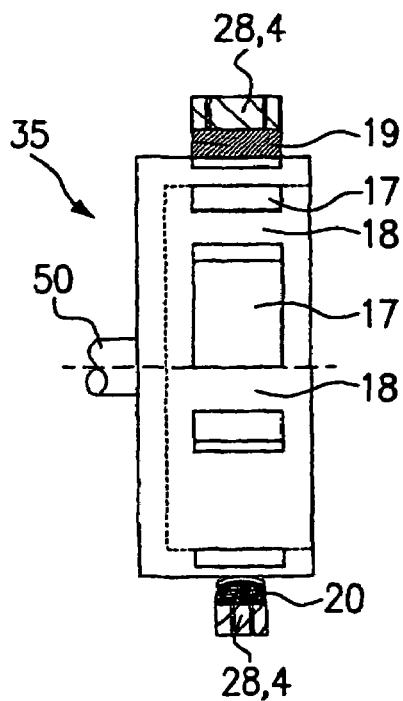
FIG. 9 is a side view of the embodiments according to FIG. 8.

FIG. 9 is a side view of the embodiment of FIG. 8. The regions 17 of the circumference 34 of the disk 35 that are formed by openings can especially be seen in this side view.

It should additionally be noted that the disk 35 according to FIGS. 8 and 9 comprises a disk base which is connected to a rotary shaft 50. An annular flange which with its outside forms the circumference 34 according to FIGS. 8 and 9 projects from said disk base. The corresponding regions 17, 18 are formed along the annular flange. In connection with FIGS. 6 to 9, it should once again be noted that it is also possible that the corresponding disks are stationary and that the scanning means move around the disks 34 in circular or helical fashion.

Figure 10:
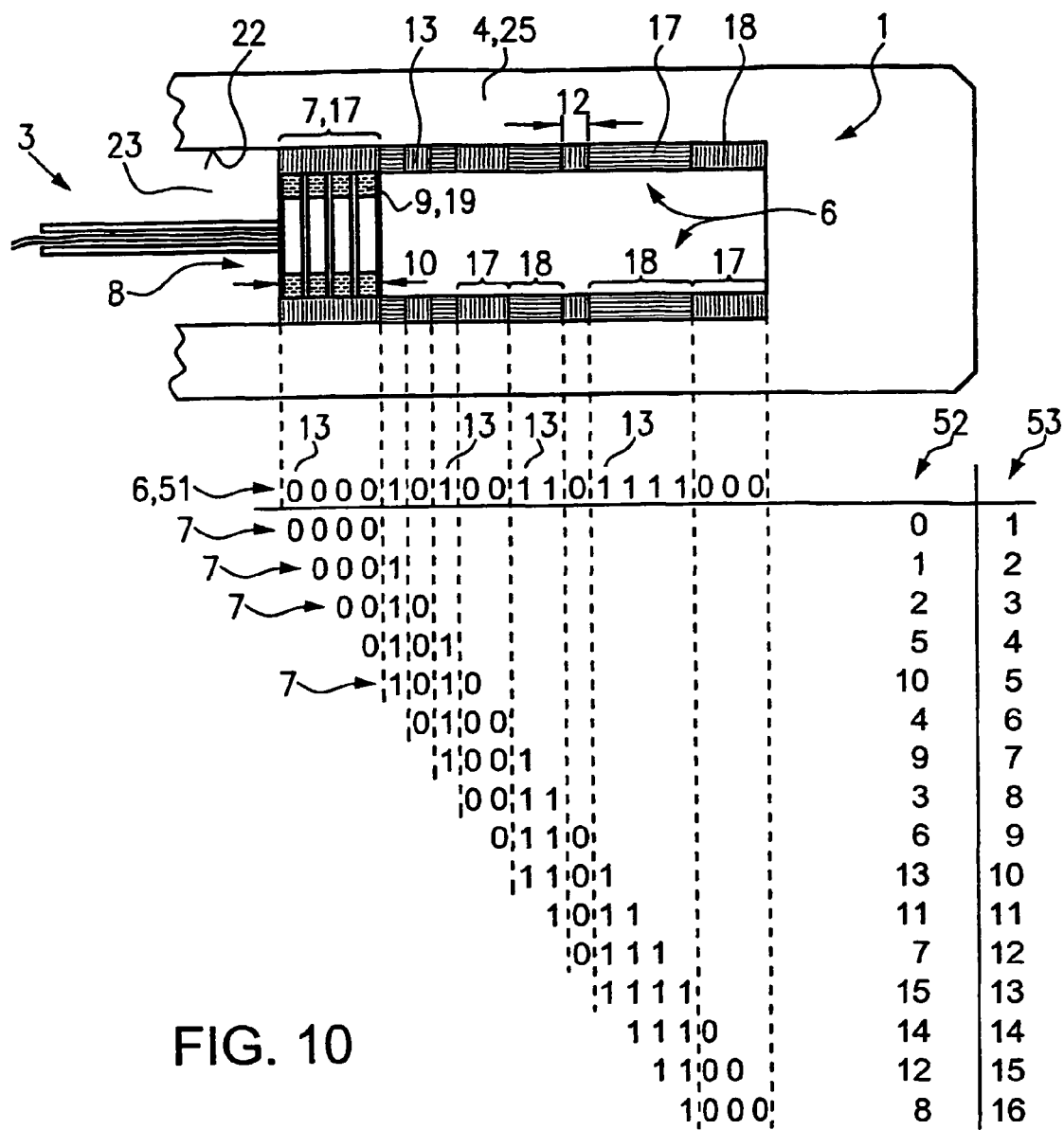
FIG. 10 gives an example of different coding patterns for determining the position in an embodiment of the transducer.

FIG. 10 depicts a four-bit coding of a corresponding coding pattern 6 in connection with an embodiment of a transducer 1.

The transducer 1 comprises the movable first device part 3, of which essentially only the scanning means 8 is shown. The scanning means is inserted into an inner bore 23 of the stationary second device part 4, which may e.g. be a piston according to FIGS. 1 and 2. However, it is possible that the scanning means 8 is movable and the coding pattern 6 is stationary.

The coding pattern 6 is formed on the inner wall 22 of the inner bore 23 by regions 17, 18 of different conductivity. For example, the regions 17 are conductive and the regions 18 are non-conductive. The coding pattern 6 comprises a number of bit pattern groups 7 which can be scanned in successive order through the relative movement of the scanning means 8 and the coding pattern 6. In the initial position of the scanning means 8 relative to the coding pattern 6, as is shown in FIG. 10, a bit pattern group 17 is scanned that is formed of a conductive region 17. The bit pattern group 7 comprises four single bits 13 according to the number of the single scanning elements 9 of the scanning means 8. These single bits have a bit length 12 which is defined by a corresponding extension 11 of the single scanning elements 9. This means that the region 17 which is scanned in FIG. 10 as the first bit pattern group 7 comprises four single bits 13, which form the conductive region 17 on the whole. An extension 10 of the scanning means 8 is just identical with a corresponding extension of the bit pattern group 7 or the conductive region 17.

The next bit pattern groups 7 (see the different numerical combinations in the lower part of FIG. 10) are obtained from a displacement of the scanning means 8 by one single bit 13 each to the right side in FIG. 10. If a single bit 13 falls within a non-conductive region 18, this is represented by a "1" whereas single bits 13 in the conductive region 17 are represented by a "0". The coding 51 of the coding pattern 5 which defines the position-specific bit pattern groups follows from this sequence of "0" and "1".

When the four-bit coding 51 of the different bit-pattern groups 7 is each time converted into a decimal numerical value 52, the numerical values of 0 to 15 as shown in the corresponding column are obtained. This means that a different decimal numerical value of 0 to 15 can be assigned to each of the bit pattern groups 7. Independently of the sequence of the decimal numerical values 52, a specific positional value 53 is assigned to each of the successively scanned bit pattern groups 7. The positional values 53 are here in ordered form, and numerical values of 1 to 16 are assigned to them.

To obtain more positional values 53, a five-bit coding (see FIGS. 13 and 14), a six-bit coding, a seven-bit coding, etc. may e.g. be used. It is known that due to the corresponding number of the bits for a coding and the two states or features for each single bit as used for a coding in the illustrated embodiment, the corresponding positional values are obtained as 2 DWB, where DWB is the data word width which includes, for instance, 4 bits, 5 bits, 6 bits, etc. The data word width is here identical with a bit pattern group or a single pattern.

However, it is also possible that each single bit may have 3 different states or characteristics, so that the coding operation may be carried out in a correspondingly different way.

It should here be noted in addition that when the state or feature of the single bits is e.g. conductive/non-conductive, each of said single bits may be formed by a metal ring (conductive) or plastic ring (non-conductive). When several single bits are here in the same state, the corresponding ring of metal or plastic may be given a larger width.

Figure 11:
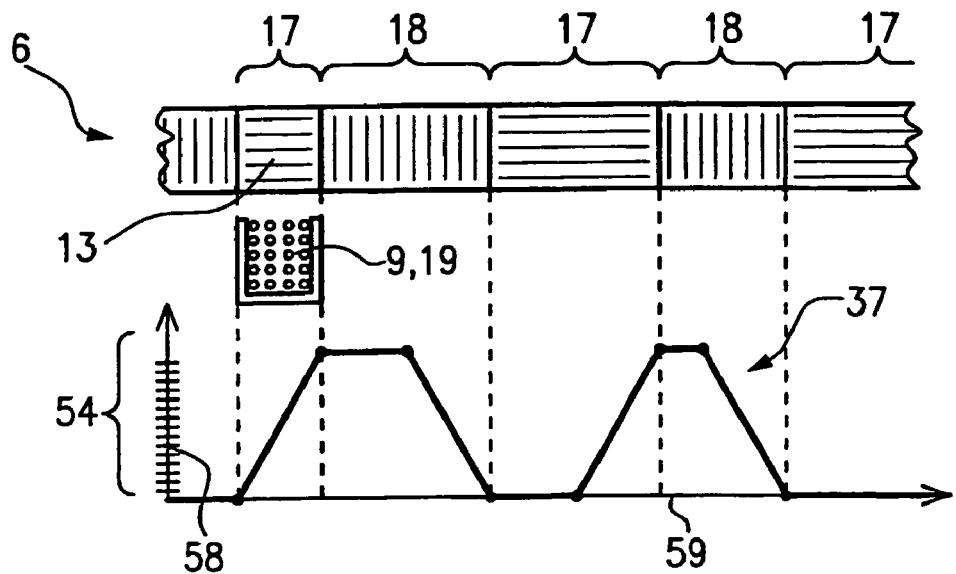
FIG. 11 shows the total movement information sensed by a single scanning element of a scanning means.

FIG. 11 shows the measured signal information 37 in connection with an electrical coil 9 as the single scanning element 9 and conductive/nonconductive regions 17, 18 as the coding pattern 6. This information is obtained when the bit pattern 6 is scanned by the corresponding scanning means 8 or by a single scanning element 9. The path 9 is plotted on the abscissa and an analog resolution 54 of a signal voltage 58 for an electrical coil 19 is shown on the ordinate. This means that the curve of the measured signal information 37 is evaluated in an analog or quasi analog form in the region of the signal voltage 58. This yields a very exact curve or profile of the measured signal information 37 in dependence upon the path 59.

Upon a first scanning of the bit pattern 6, measured signal information 37 can e.g. be stored in the storage means 36 of the control and evaluation means 61 of the transducer 1. When measured signal information is subsequently obtained during current scanning, this information can be compared with the measured signal information stored. When the two types of measured signal information are then compared, the relative position of the movable first device part and stationary second device part can be detected via the bit length 12 of a single bit 13 with a higher resolution. For instance, the types of measured signal information from one, two, three, four or more single scanning elements 9 are compared with one another and made congruent, so that it is not only possible to determine the position accurately at the bit level, but it is also possible to sense transitions between bits, sections between the bits, etc. The corresponding resolution of the position follows substantially from the analog bit resolution 54 according to FIG. 11 and a corresponding bit width 12, see e.g. FIG. 10.

Since the measured-value signal information 37 is recorded during a first scanning operation and since corresponding current measured-value information is recorded, it is possible in addition—if these types of information are stored in a non-volatile storage means—that these types of information are retrieved and compared with one another in case of failure of the electrical means at a later time upon a renewed start and that the relative position between the first and second device part is determined in an exact and direct way. This is also possible with the coding patterns as such, and in this instance it might be that only upon a renewed start the specific bit pattern group next to the position has to be scanned if there is no exact assignment of scanning means and bit pattern group.

Figure 12:
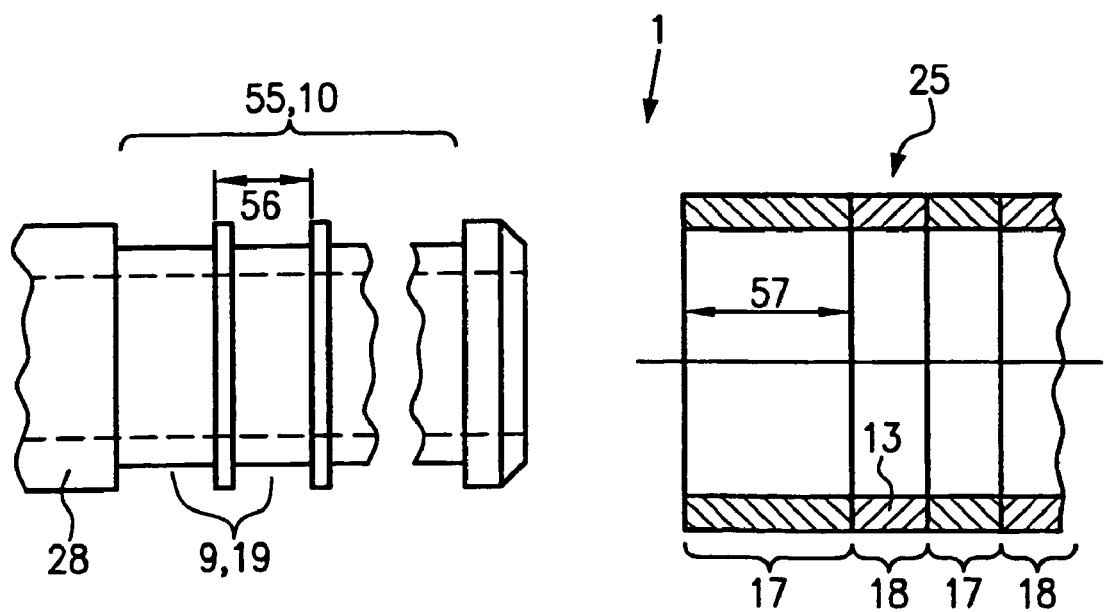
FIG. 12 shows a sketch for explaining the scanning means and coding patterns.

FIG. 12 shows a simple transducer 1 for explaining a few measurement parameters. The transducer 1 comprises a movable device part and a stationary device part, one of said device parts being e.g. the scanner carrier 28 and the other device part the bit pattern carrier 25. Electrical coils 19 (not shown) are arranged side by side on the scanner carrier 28 as single scanning elements 9, the number of the single scanning elements 9 defining the overall length of the scanning means 8 and also the length of the bit pattern group.

A so-called mechanical bit width 56 can be assigned to each single scanning element 9. The total data word width 55 or extension 10 of the scanning means 8 follows from the number of the single scanning elements.

In this instance, the resolution follows as the quotient of an analog bit resolution, see reference numeral 54 in FIG. 11, and the mechanical bit width 56. The analog bit resolution is e.g. indicated in step per bit and the mechanical bit width in mm per bit.

The length to be measured by the transducer 1 follows from the product of mechanical bit width 56 and the maximum number of the possible positions 54 reduced by one (see FIG. 10).

The total length of a path to be scanned by the scanning means follows essentially from the addition of the length of the measurement path and the extension 10 of the scanning means 8.

The maximum length of a region 17 (see the right half in FIG. 12) follows also from said extension 10 or sensor length 57 of the scanning means 8.

Figure 13:
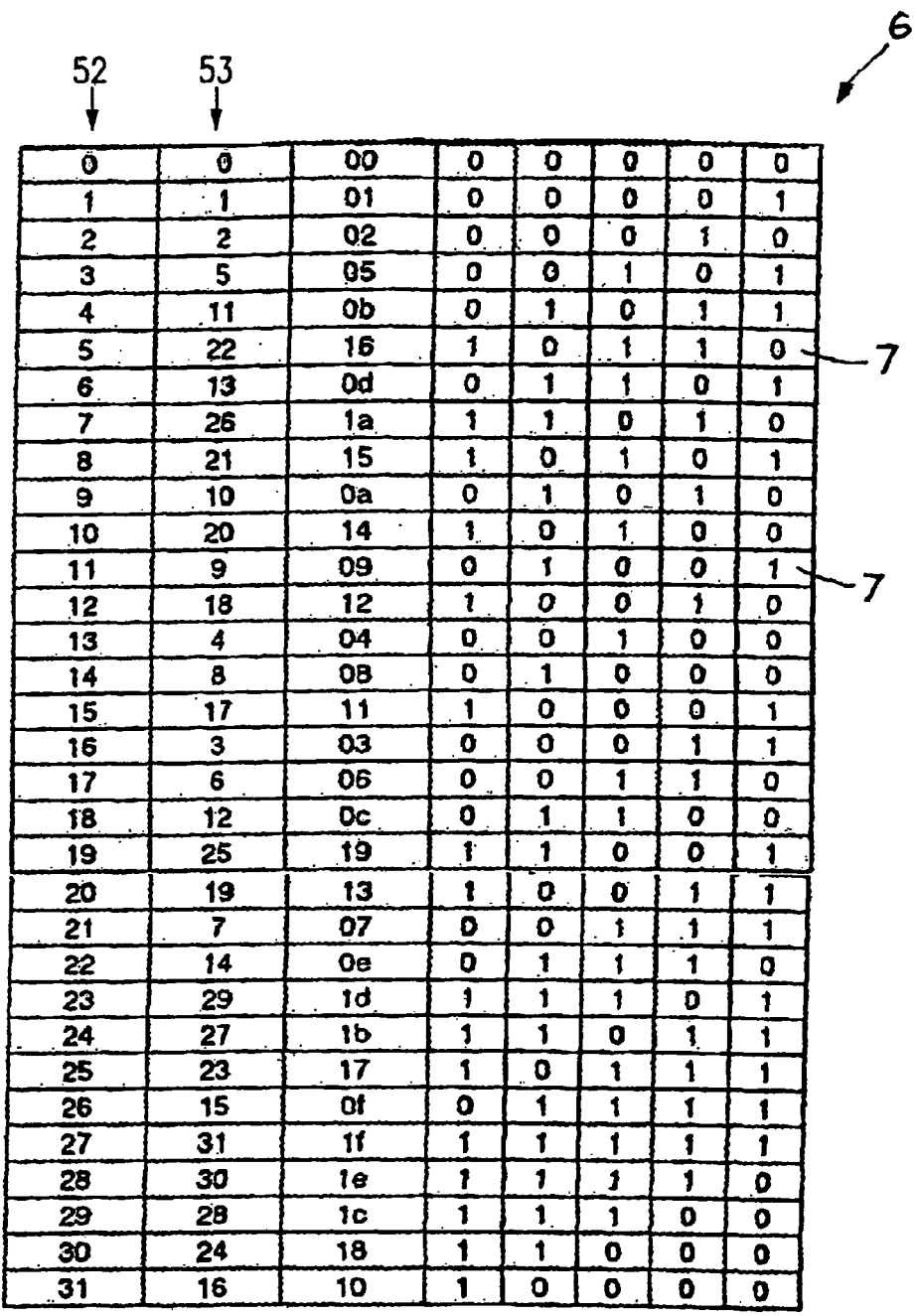
FIG. 13 gives a further example of a coding pattern with five binary single patterns in one single pattern group.
Figure 14:
FIG. 14 shows a serially arranged coding pattern according to FIG. 13.
Figure 14:

FIGS. 13 and 14 show a further coding pattern 6 with corresponding individual patterns in the form of bit pattern groups. In this instance, $2^5$ decimal values 52 or 32 positional values 53 can be assigned to the coding pattern. Each single pattern group 7 comprises five single bits 13 as the single pattern in this connection.

The different single patterns, in turn, follow from the displacement by one respective single bit 13 along the serial arrangement of the coding pattern 6 according to FIG. 14. In this context it should be noted that the bit pattern groups assigned to the respective ends of the coding pattern 6 are obtained by cyclic displacement. This means that e.g. the fourth single pattern group "1110" from last according to FIG. 13 follows from the last four "1" values at the right side in FIG. 14 and from the first "0" at the left side in FIG. 14. The three single pattern groups following said fourth single pattern group from last according to FIG. 13 are obtained by analogy.

FIG. 15 is a top view on an embodiment of a pattern carrier 25 according to the invention which has arranged thereon a coding pattern 6 in the form of position-specifically differently structured single patterns 7: Said single patterns 7 are formed by conductivity patterns 49 that are arranged one after the other in the direction of movement 6. Said pattern carriers 25 can be connected to one of the device parts according to the preceding figures, with a corresponding scanner carrier 28 being illustrated in the subsequent FIG. 16. Pattern carrier 25 and scanner carrier 28 according to FIGS. 15 and 16 are displaced relative to one another.

The conductivity patterns according to FIG. 15 are approximately diamond-shaped, the patterns comprising edges 65 rising in the direction of movement 5 and edges 66 falling in the direction of movement. The conductivity patterns 49 are made symmetrical relative to a horizontal plane 69 extending in the direction of movement 5, and a symmetrical configuration may also be present with respect to a vertical plane 17 perpendicular to the direction of movement 5.

The different conductivity patterns 49 are e.g. formed by a conductive metallic material, such as copper or the like. This can be structured by etching, as is e.g. known from the technical field of printed circuit boards.

FIG. 16 shows a further embodiment of a scanner carrier 28. Said carrier has arranged thereon six conductors 77 to 81 that are connected to corresponding coils 71 to 76. Further conductors of the same type are arranged on the back side (not shown) of the scanner carrier 28 and are each connected approximately in the middle to the corresponding coils 71 to 76.

The various coils 71 to 76 form corresponding single scanning elements 9 of the scanning means 8.

Figure 17:
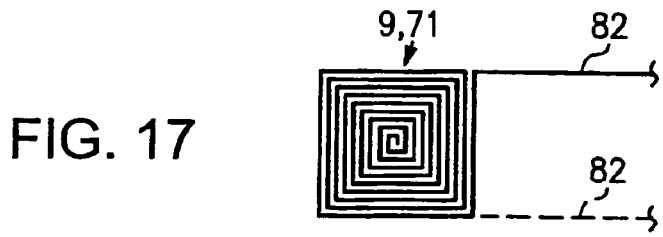
FIG. 17 is an enlarged view showing a detail "X" of FIG. 16.

FIG. 17 shows a detail "X" of FIG. 16 on an enlarged scale. Said detail is particularly the coil 71 as the single scanning element 9, which is essentially square and comprises a winding which is winding inwards in the form of a spiral. The winding end is passed to the corresponding other side of the scanner carrier 28 according to FIG. 16 and is there connected to a further conductor.

The construction of the further coils 72 to 76 is analogous.

Figure 18:
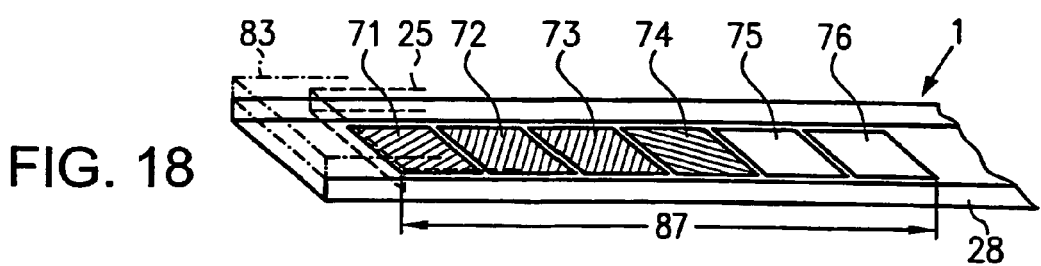
FIG. 18 is a perspective top view on a pattern carrier displaceably supported between two scanner carriers according to one embodiment of the invention.

FIG. 18 shows a corresponding transducer 1 which is formed by two scanner carriers 28 according to FIG. 16 and a pattern carrier 25 according to FIG. 15. The pattern carrier 25 is arranged between the two scanner carriers 28 arranged relative to each other and is supported in a displaceable way relative thereto. Corresponding coils 71 to 76 are arranged on both scanner carriers 28 with corresponding conductors 77 to 82 according to FIG. 16, said members being not shown in FIG. 18 for the sake of simplicity. Corresponding coils 71 to 76 are illustrated only for the lower scanner carrier 28 in FIG. 18.

Figure 19:
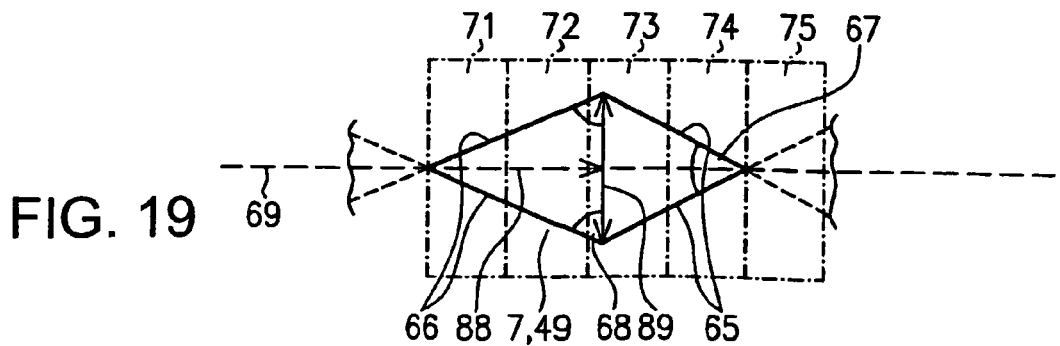
FIG. 19 is a basic illustration of the assignment of conductivity patterns according to FIG. 15 and single scanning element according to FIG. 16.

FIG. 19 is a basic sketch for showing the assignment of coils 71 to 76 to the conductivity patterns 49, as is obtained for a transducer 1 according to FIG. 18.

Figure 21:
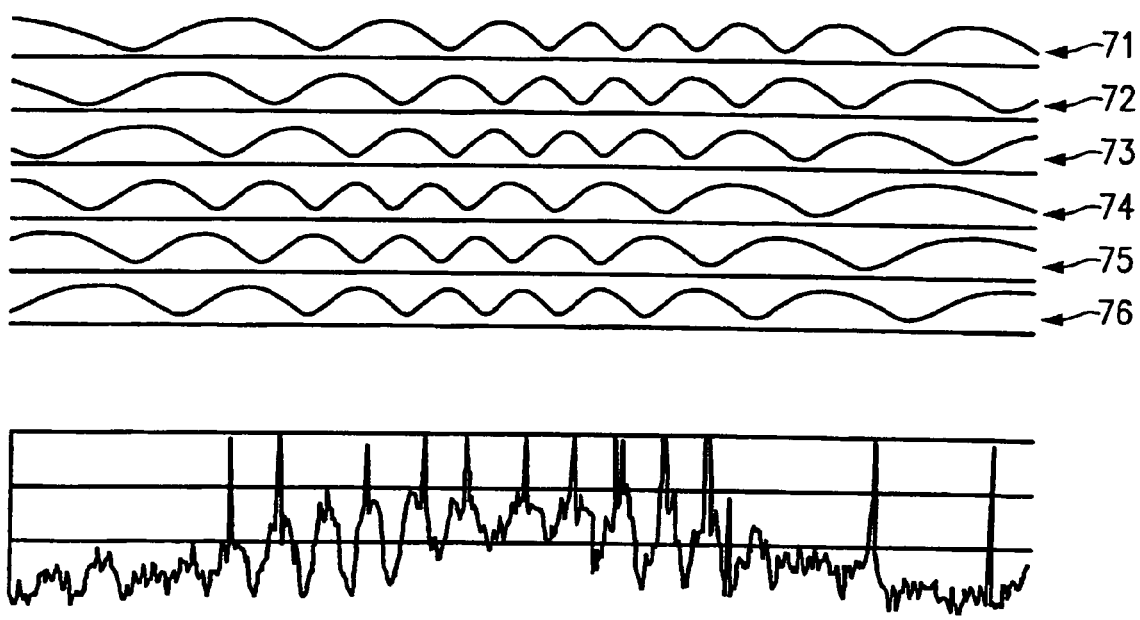
FIG. 21 is a sketch for illustrating the signals of the various single scanning elements or scanning coils according to FIG. 16.

During the relative movement of the corresponding coils 71 to 76 towards the conductivity patterns 49, signals according to FIG. 21 are obtained (see the upper six signal curves). The corresponding signal curves of each coil are phase-shifted approximately by the width of a coil. According to the invention attention must be paid that the extension 87 of all coils 71. to 76 in the direction of movement 5, see FIG. 15, is greater than a maximum length 88 of a rising or falling edge 65, 66 of the conductivity pattern 49, see FIG. 19. It is thereby ensured that at least one of the coils senses either the next following conductivity pattern or the respectively other edge 65, 66 of the one conductivity pattern 49 that is just being scanned. This means that at least one transition from rising to falling edge 65, 66 should be sensed on a conductivity pattern 49 or between two conductivity patterns 49. Attention must here be paid that the corresponding edge rises 67, 68 from rising edge or falling edge 66 relative to the horizontal plane 69 or the direction of movement 5 are different in their absolute value. This means that the rise 67 differs from the rise 68 in its absolute value, the absolute values of the rises 65, 68 being also different from the absolute values of the edges of the next neighboring conductivity pattern 49. At the same height 89 of each conductivity pattern 49 vertical to the horizontal plane 69, it is thereby ensured that particularly the transitions between the conductivity patterns 49 and the transitions between rising and falling edge 65, 66 are definitely obtained through the corresponding signals of the coils 71 to 76 (see the upper six curves in FIG. 21).

In FIG. 21, and particularly in the upper six illustrated signal curves or profiles, attention must be paid that the curves correspond to the scanning of the whole coding region of the pattern carrier 25 according to FIG. 15, each of the curves being assigned to one of the coils 71 to 76. When the corresponding scanner carrier 28 is then positioned in a specific relative position with respect to the pattern carrier 35, the signals of the six coils 71 to 76 each yield a signal serving to determine the position in an exact way in that the corresponding signals and their relations to one another are compared with the curves according to FIG. 21.

In the lower part of FIG. 21, the noise ratio from an actual position to another position is illustrated in relation to the upper six curves.

Figure 20:
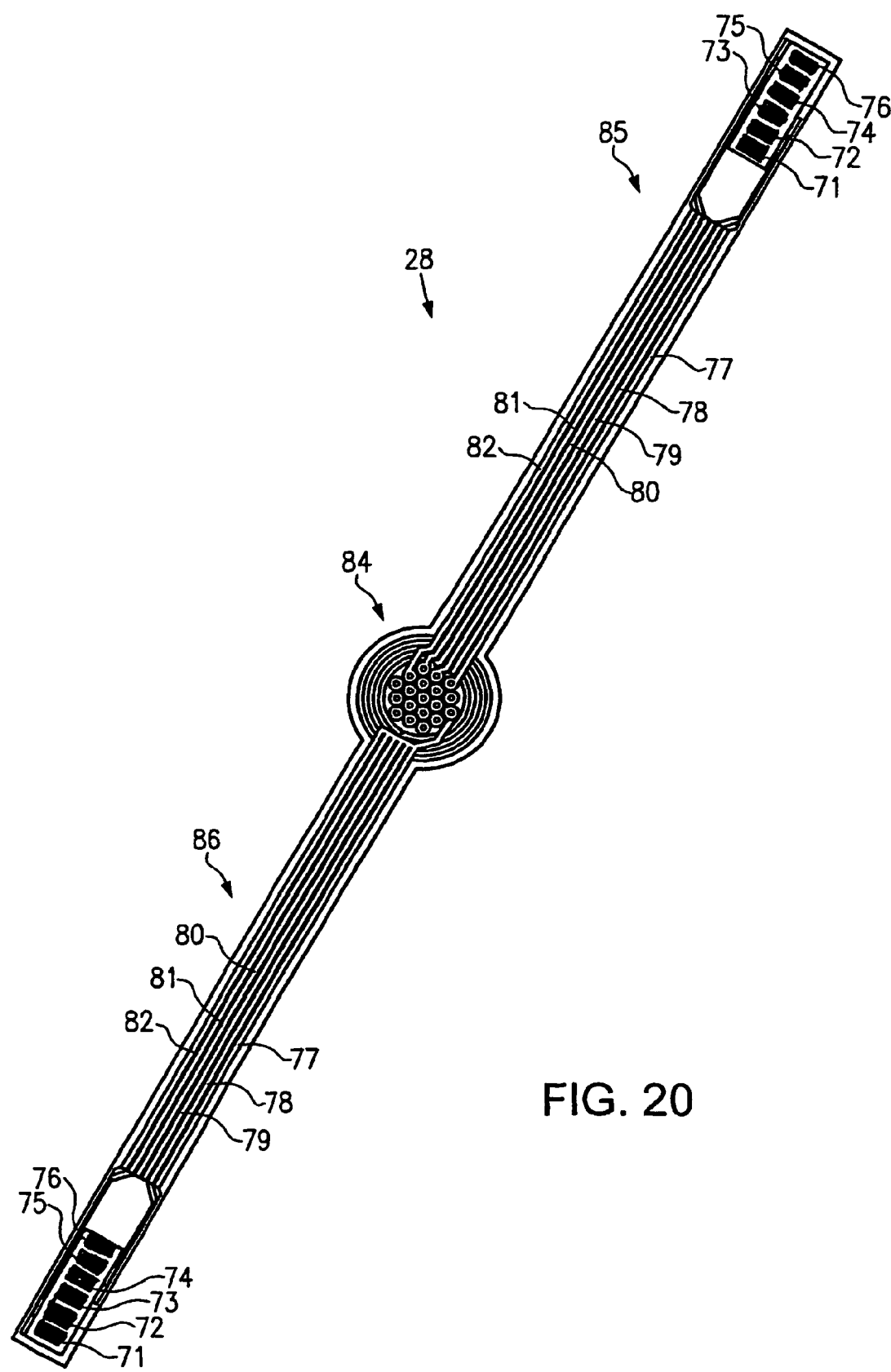
FIG. 20 is a top view on a further embodiment of a scanner carrier with single scanning coils according to the invention.

FIG. 20 is a top view on a further embodiment of a scanner carrier 28 which basically corresponds to the two scanner carriers 28, 83 according to FIG. 18. In FIG. 20, the scanner carrier 28 is formed from a foil material on which the conductors 77 to 82 and the scanning coils 71 to 76 are arranged accordingly. These may be formed either by etching a copper coating of the corresponding foil, as is known in a similar way for printed circuit boards, or the like.

The scanner carrier 28 according to FIG. 20 is constituted of an approximately circular central piece 84 that serves the connection of a corresponding electrical connection means, with two carrier arms 85, 86 projecting laterally from the central piece 84 opposite each other. Along the carrier arm 86 the coils 71 to 76 are powered in parallel at the end of the carrier arm 86. On the back side of the carrier arm 86 a connection is established via corresponding further conductors to the coils 71 to 76 arranged at the end of the carrier arm 85 and then a connection via further conductors 77 to 82 back to the central piece 84. At said place single coils 71 to 76 can then be queried individually via corresponding contacts.

Upon use of the scanner carrier 28 in FIG. 20 the two carrier arms 85, 8, are bent onto and arranged in parallel with each other, a corresponding pattern carrier 25 being arranged between the two, e.g. according to FIG. 15, to be displaceable relative thereto.

It should additionally be noted that the geometrical structuring of the corresponding conductivity patterns 49 according to FIG. 15 and 9, respectively, is only by way of example; other geometrical structures are possible that permit position-specific signals by corresponding single scanning elements 9. For example, differently curved conductivity patterns are possible that also ensure that different signals are produced by the corresponding single scanning elements during displacement along the coding pattern. Also the different arrangement of scanning elements 9 and patterns 6 according to FIGS. 1–9 are possible with the embodiments of FIGS. 15–20.

The invention claimed is:

1. An apparatus for determining at least one kinematic measurable variable, comprising:
   a device having first and second device parts;
   said first device part being movable in or through said device and having the kinematic measurable variable to be determined,
   said second device part being stationary relative to said first device part, said first and/or second device part(s) having a coding pattern which is changing along a direction of movement of said first device part,
   said coding pattern having position-specific single patterns,
   a sensor arranged on the respectively other device part,
   each single pattern being formed from a position-specifically differently structured pattern with rising and falling edges, succeeding one another in said direction of movement.

2. The apparatus according to claim 1, wherein said pattern is a conductivity pattern.

3. The apparatus according to claim 1, wherein at least neighboring rising edges have different absolute values.

4. The apparatus according to claim 2, wherein said conductivity patterns are made symmetrical relative to a horizontal plane in the direction of movement.

5. The apparatus according to claim 2, wherein said conductivity patterns are made substantially symmetrical relative to a line perpendicular to said direction of movement.

6. The apparatus according to claim 2, wherein said conductivity patterns are produced by etching, or the like.

7. The apparatus according to claim 1, wherein the sensor comprises a number of single sensor elements.

8. The apparatus according to claim 7, wherein an extension of said single sensor elements in the direction of movement is essentially identical with a length of a single pattern of said coding pattern.

9. The apparatus according to claim 7, wherein each single sensor element comprises at least one coil.

10. The apparatus according to claim 1, wherein two sensors are specifically arranged in direct vicinity in the direction of movement.

11. The apparatus according to claim 1, wherein said direction of movement extends along a straight line.

12. The apparatus according to claim 1, wherein said direction of movement extends in helical fashion.

13. The apparatus according to claim 1, wherein said direction of movement extends substantially in circular fashion.

14. The apparatus according to claim 1, wherein said coding pattern is formed along a pattern carrier which is detachably attached to said device.

15. The apparatus according to claim 14, wherein said pattern carrier extends coaxial to an inner bore of said device.

16. The apparatus according to claim 1, wherein said coding pattern comprises single patterns arranged along a circular path.

17. The apparatus according to claim 1, wherein said coding pattern comprises single patterns arranged along at least one of a circumference of a disk and a circular path.

18. The apparatus according to claim 1, wherein said coding pattern comprises single patterns slotted in a disk.

19. The apparatus according to claim 7, wherein said single sensor elements are supported to be radially adjustable.

20. The apparatus according to claim 16, wherein the number of the single patterns of a coding pattern is defined by a number of single sensor elements of said sensor.

21. The apparatus according to claim 1, further comprising at least one storage medium for storing signals output from said sensor.

22. The apparatus according to claim 7, wherein signals output from the single sensor elements can be referenced to determine a position of the first device part.

23. The apparatus according to claim 7, wherein signals output from the single sensor elements can be referenced to determine a velocity of the first device part.

24. The apparatus according to claim 21, further comprising a unit that compares information associated with a stored output signal with information associated with a current output signal.

25. The apparatus according to claim 24, wherein information associated with at least a last output signal is stored until replacement by information associated with a subsequent output signal.

26. The apparatus according to claim 21, wherein analog techniques are implemented to measure and evaluate the signals output from the sensor.

27. The apparatus according to claim 1, wherein the sensor and the coding pattern are configured to be replaceable.

28. The apparatus according to claim 1, wherein a pressure-resistant multiple cable passage is provided for electrical connection of said sensor.

29. The apparatus according to claim 9, wherein each single sensor element comprises a plurality of coils arranged one after the other in the direction of movement.

30. The apparatus according to claim 9, wherein each single sensor element comprises a coil wound substantially in spiral form in a plane.

31. The apparatus according to claim 9, wherein coils and conductors that power the coils are arranged on surfaces of a sensor carrier.

32. The apparatus according to claim 14, wherein the pattern carrier is supported and displaceable between two sensor carriers.

33. The apparatus according to claim 32, wherein said sensor carriers are substantially designed as a carrier foil with a central piece and two carrier arms projecting therefrom, wherein said central piece comprises an electrical connection portion and said carrier arms comprising single sensor elements and conductors, and wherein said carrier arms are adapted to be arranged at both sides of the pattern carrier.

34. The apparatus according to claim 9, wherein said at least one coil comprises a plurality of coils that are connected in parallel.

35. The apparatus according to claim 9, wherein the at least one coil extends, in at least one direction of movement of the moveable part and a direction perpendicular to the direction of movement, to greater than a maximum length or height of a single pattern so that said at least one coil is assigned at least to a rising and a falling edge of at least one single pattern or of neighboring single patterns.

36. The apparatus according to claim 35, wherein the height of all single patterns is the same.

37. The apparatus according to claim 1, wherein said coding pattern comprises geometric shapes.

38. A method for determining a kinematic measurable variable, the method comprising:
moving a movable object relative to a stationary object;
arranging a specific coding pattern on either the movable or the stationary object, the specific coding pattern being composed of position-based single patterns having at least one edge that is rising and falling relative to a direction of movement of the movable object and pertains to one or two neighboring single patterns formed of a conductive material;
scanning the position-based single patterns during the mutual relative movement of said objects using a scanner having a number of scanning coils scanning the at least one edge; and
converting the scanning signal by an evaluation unit into a kinematic measurable variable.

39. The method according to claim 38, wherein scanning the coding pattern comprises scanning each of a plurality of single patterns associated with said coding pattern singly and successively.

40. The method according to claim 38, wherein scanning the coding pattern comprises simultaneously scanning all single patterns of the coding pattern.

41. The method according to claim 38, wherein scanning comprises determining at least one feature of a single pattern associated with the coding pattern.

42. The method according to claim 38, wherein scanning comprises simultaneously scanning different single patterns associated with the coding pattern.

43. The method according to claim 38, wherein scanning the coding pattern comprises redundantly scanning the coding pattern.

44. The method according to claim 38, further comprising comparing current measured-signal information with total measured-signal information to determine transitions between a plurality of single patterns associated with the coding pattern.

45. The method according to claim 38, wherein scanning the coding pattern comprises scanning two opposite sides of said coding pattern.

46. An apparatus for determining at least one kinematic measureable variable, comprising:
a movable member and a stationary member, the movable member being movable relative to the stationary member;
one of the movable and stationary members having a coding pattern thereon, the coding pattern including a plurality of unique shapes along the direction of movement of the movable member, each unique shape indicating a position of the movable member relative to the stationary member; and
a scanner on the other of the movable and stationary members detecting the unique shapes to determine the at least one kinematic measurable variable.

47. The apparatus of claim 46 wherein each unique shape has a unique amount of conductive material deposited on one of the movable and stationary members.

48. The apparatus of claim 47 wherein each unique shape has a sloping edge.

49. The apparatus of claim 46 wherein the coding pattern is disposed on a removable member which is mounted on the one of the movable and stationary members.

50. A petroleum production system, comprising:
a first device having a moving part and a non-moving part;
a coding pattern assigned to one of the moving part and the non-moving part, the coding pattern comprising rising and falling edges that vary in length along a direction of movement of the moving part and corresponding to positions of the moving part; and
a sensor that determines a kinematic measurable variable by distinguishing between edge lengths.

51. A method for determining a kinematic measurable variable, the method comprising:
assigning a coding pattern to one of a moving part and a non-moving part of a device, the coding pattern comprising rising and falling edges that vary in length along a direction of movement of the moving part and corresponding to positions of the moving part;
scanning the coding pattern when the moving part moves; and
determining the kinematic measurable variable based on a length of at least one of the edges.

* * * * *